United States Patent [19]

Carlton

[11] Patent Number: 5,707,438
[45] Date of Patent: Jan. 13, 1998

[54] COMPOSITE CUPROUS OXIDE POWDER

[75] Inventor: John N. Carlton, Townsend, Mont.

[73] Assignee: American Chemet Corporation, Mont.

[21] Appl. No.: 604,736

[22] Filed: Feb. 21, 1996

[51] Int. Cl.$^6$ ................ C09D 5/16; C09C 1/00
[52] U.S. Cl. ............ 106/480; 106/15.05; 423/604; 424/405; 424/630; 424/635; 424/417; 428/403; 428/404; 428/689; 428/699; 428/701; 428/702
[58] Field of Search ................ 106/401, 480, 106/15.05; 423/604; 424/630, 635, 405, 417; 428/195, 206, 209, 403, 404, 689, 702, 699, 701; 114/222

[56] References Cited

U.S. PATENT DOCUMENTS

| | | | |
|---|---|---|---|
| 3,100,719 | 8/1963 | Dunn, Jr. et al. | 106/480 |
| 3,620,943 | 11/1971 | White | 114/222 |
| 5,354,603 | 10/1994 | Errede et al. | 422/6 |
| 5,382,475 | 1/1995 | Kayser | 428/403 |

*Primary Examiner*—Michael Marcheschi
*Attorney, Agent, or Firm*—Hopgood, Calimafde, Kalil & Judlowe

[57] ABSTRACT

A composite cuprous oxide powder is provided comprising at least about 80% by weight of cuprous oxide particles and substantially the balance cupric oxide adhering to cuprous oxide particles. The composite cuprous oxide powder is produced by surface oxidizing cuprous oxide particles to form a black coating or layer thereon. The composite powder is produced by subjecting particles of cuprous oxide to surface oxidation at a temperature ranging from about 400° F. to less than about 900° F. for a time period sufficient to surface oxidize the particles of cuprous oxide and produce a black coating thereon of cupric oxide. The method is applicable to the production of black pigment grade cuprous oxide powder.

14 Claims, 3 Drawing Sheets

COMPOSITE CUPROUS OXIDE POWDER

This invention relates to the production of a composite cuprous oxide powder suitable for use as an anti-fouling agent in marine applications.

STATE OF THE ART

It is known to protect marine structures, such as the bottom of ships, steel pilings and other marine structures, from the attachment of marine fouling organisms by employing an anti-fouling agent comprised of red cuprous oxide in the form of an anti-fouling paint.

In a 1952 article entitled "Marine Fouling and Its Prevention" prepared for the U.S. Bureau of Ships, Navy Department, by the Woods Hole Oceanographic Institution (hereinafter the Woods Hole article), the processes of dissolution and the oxidation of copper and cuprous oxide are discussed.

The Woods Hole article, which is included herein by reference, states that it is the rate of solution of the anti-fouling agent which determines anti-fouling effectiveness and that the two most widely used anti-fouling agents are copper metal and cuprous oxide, cuprous oxide being the most commonly used anti-fouling agent.

Experiments are mentioned in the Woods Hole article in which a mixture of 90% cuprous oxide and 10% Vinylite as a matrix for a non-fouling paint is applied to a surface to be protected using a volatile solvent as a carrier (e.g. xylene). The strength and insolubility of the plastic matrix is such as to enable a coating of the non-fouling paint to resist erosion due to constant motion or agitation of sea water as it contacts the coated metal substrate. With regard to a paint composition containing 90% cuprous oxide which corresponds to a hypothetical surface of pure cuprous oxide, the leaching rate was indicated as being about 250 µg per sq. cm. per day which is somewhat high. Leach rates may vary from about 5 µg per sq. cm per day to 200 µg per sq. cm. per day, an example of a steady state leach rate being about 10 to 50 µg per sq. cm. per day.

It has been discovered that the leaching rate can be controlled to desirable levels by specially oxidizing the surface of particles of cuprous oxide to form a coating or layer of black cupric oxide in relatively low amounts.

For cosmetic or other reasons, it may be desirable to provide a black anti-fouling agent comprised substantially of cuprous oxide capable of providing protection to the surface of a metal substrate in marine applications.

One attempt towards fulfilling this objective is disclosed in White U.S. Pat. No. 3,620,943 which issued Nov. 16, 1971. The main object of this patent was to provide black antifouling paints suitable for use as a camouflage paint for submarines to prevent the growth of calcareous deposits on the antifouling painted steel surfaces.

While cuprous oxide mixed with black iron oxide is used in the formulation of the antifouling paint disclosed in the patent, the amounts of cuprous oxide employed were limited to a range of about 50% to 75% cuprous oxide by weight and the balance about 10% to 25% black iron oxide dispersed through a paint vehicle. However, this formulation has its limitations in the amount of cuprous oxide employed and also in the control of leaching rate of a coated substrate subjected to a marine environment.

It would be desirable to provide a composite cuprous oxide powder characterized by a black color and in which the copper content of the powder is not diluted by the presence of a foreign blacking agent, such as black iron oxide.

OBJECTS OF THE INVENTION

It is an object of the invention to provide a blackened cuprous oxide composite powder composition comprised substantially of cuprous oxide, e.g., at least about 80% or 85% by weight, without the necessity of adding a foreign blacking pigment.

Another object is to provide a black cuprous oxide powder of controlled leaching rate for use as an anti-fouling agent for protecting marine structures against the action and attachment of marine fouling organisms for a prolonged period of time.

Another object of the invention is to provide a method of producing a blackened cuprous oxide pigment by the partial oxidation of said cuprous oxide while maintaining the efficacy of the cuprous oxide as an anti-fouling agent characterized by a controlled leaching rate.

A further object of the invention is to provide an anti-fouling paint containing said blackened cuprous oxide pigment.

These and other objects will more clearly appear from the following disclosure, the claims and the appended drawings.

DRAWINGS

SUMMARY OF THE INVENTION

Figure 1:
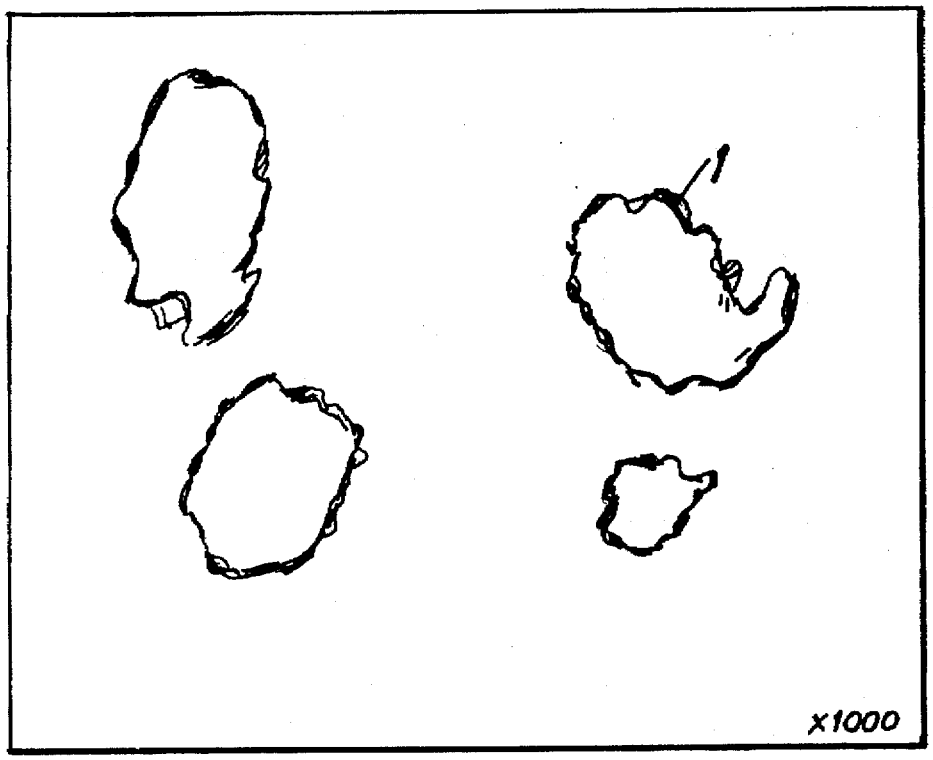
FIG. 1 is a representation of a microstructure of partially oxidized cuprous oxide powder showing black cupric oxide attached to the surfaces of the cuprous oxide powder, the microstructure being shown at approximately 1,000 times magnification.

Stating it broadly, one embodiment of the invention resides in a composite cuprous oxide powder comprising at least about 80% by weight of cuprous oxide particles with substantially the balance cupric oxide adhering to the surfaces of said cuprous oxide particles as a continuous or discontinuous coating to provide a blackened cuprous oxide powder. A preferred method is to produce the composite powder by surface oxidizing said cuprous oxide particles. The terms "coating" or "layer" used herein are meant to include continuous or discontinuous layers of said cupric oxide.

Another embodiment of the invention is directed to a method of producing a pigment grade composite cuprous oxide powder wherein particles of cuprous oxide are partially oxidized at a temperature ranging from about 400° F. to less than about 900° F. for a period of time sufficient to surface oxidize particles of said cuprous oxide, e.g., preferably for a period of time ranging from about 40 minutes to about 120 minutes, the preferred average particle size of said cuprous oxide prior to oxidation being less than about 325 mesh.

Preferably, the temperature of oxidation ranges from about 400° F. or 500° F. to 800° F. over a time period sufficient to oxidize the surface of the cuprous oxide, e.g., for about 40 or 60 minutes to about 120 minutes.

A further embodiment of the invention comprises an anti-fouling paint for use in marine applications in which the composite powder is dispersed through a liquid vehicle such as the vehicles referred to in the White U.S. Pat. No. 3,620,943.

Generally speaking, natural or synthetic resins may be employed as a vehicle which include such vehicles as chlorinated rubber, epoxy resin, or copolymers, e.g., tributyl tin methyl methacrylate, acrylic acid, synthetic high polymers, such as Vinylite (tradename for polyvinyl chloride—polyvinyl acetate copolymer) and polyvinyl butyral. These vehicles provide strong and durable coatings which may contain up to about 90% cuprous oxide by weight.

DETAILS OF THE INVENTION

The cuprous oxide pigment in the vehicle may range from about 3% to about 95% by weight of the mixture, e.g., from about 10% to about 95% by weight.

The control of the leaching rate of the anti-fouling paint is important. For example, an excessively high leach rate is not desirable economically and environmentally.

One advantage of the blackened cuprous oxide powder produced in accordance with the invention is that the leach rate can be controlled, depending on the composition, when used as an anti-fouling agent. Cupric oxide per se exhibits a leach rate of approximately ten (10) times slower than cuprous oxide. Thus, by coating particles of cuprous oxide powder with a cupric oxide layer by in situ oxidation, a controllable leach rate is provided which adds to the life of the coating in marine applications.

Thus, the composite cuprous oxide/cupric oxide powder enables the provision of a desired leach rate sufficient to inhibit the formation of deposits of marine organisms on a marine structure. In one aspect of the invention, as stated hereinabove, a blackened cuprous oxide pigment is provided comprising at least about 80% by weight of cuprous oxide and substantially the balance cupric oxide. Preferably, the amount of cuprous oxide may be at least about 85% by weight and range from about 85% to about 98% by weight, and more preferably, from about 90% to about 95% by weight with the balance of the powder substantially cupric oxide, including nominal or small amounts of impurities.

As illustrative of one method for carrying out the invention, the cuprous oxide powder is surface oxidized by transporting said cuprous oxide powder through a furnace at a residence time in the furnace sufficient to produce the cupric oxide coating. A preferred residence time ranges from about 60 minutes to 120 minutes.

As illustrative of the invention the following example is given.

EXAMPLE

Finely divided cuprous oxide powder of −325 mesh was passed through a furnace at a temperature in the range of about 500° F. to 900° F. in an atmosphere of air. The powder was passed through at a rate of about 1.0 IPM to 10.0 IPM (Inches Per Minute) to provide a total residence time of about 120 minutes. As a result of the foregoing treatment, the surface of the cuprous oxide powder was oxidized to a black color.

Oxidation tests were conducted at each of the temperatures 500° F., 600° F., 700° F., 800° F. and 900° F. at a residence time of about 120 minutes.

The results obtained are as follows:

| Temperature °F. | By Weight | |
| --- | --- | --- |
| | $Cu_2O$ | CuO |
| 500° F. | 96.90% | 1.06% |
| 600° F. | 96.31% | 1.83% |
| 700° F. | 93.21% | 4.84% |
| 800° F. | 82.45% | 15.65% |
| 900° F. | 65.24% | 32.91% |

Blackened cuprous oxide powder was produced at each of the temperatures, the preferred powder being produced at temperatures between 500° F. to 800° F.

By employing temperatures below 900° F., pigment grade blackened cuprous oxide powder can be produced containing as stated hereinbefore, at least about 80% cuprous oxide by weight and, more specifically, about 85% to about 98% cuprous oxide by weight. It is preferred that the oxidized powder contain about 90% to 95% by weight cuprous oxide, with the balance substantially cupric oxide and small amounts of impurities. Subsequent testing of anti-fouling paints in a marine application using the blackened cuprous oxide powder exhibited anti-fouling properties under actual conditions in the ocean.

Referring to the drawings, FIG. 1 is a representation of the microstructure of the blackened cuprous oxide powder of the invention showing a layer 1, of cupric oxide adhering to the cuprous oxide powder at about 1,000 times magnification.

Figure 2:
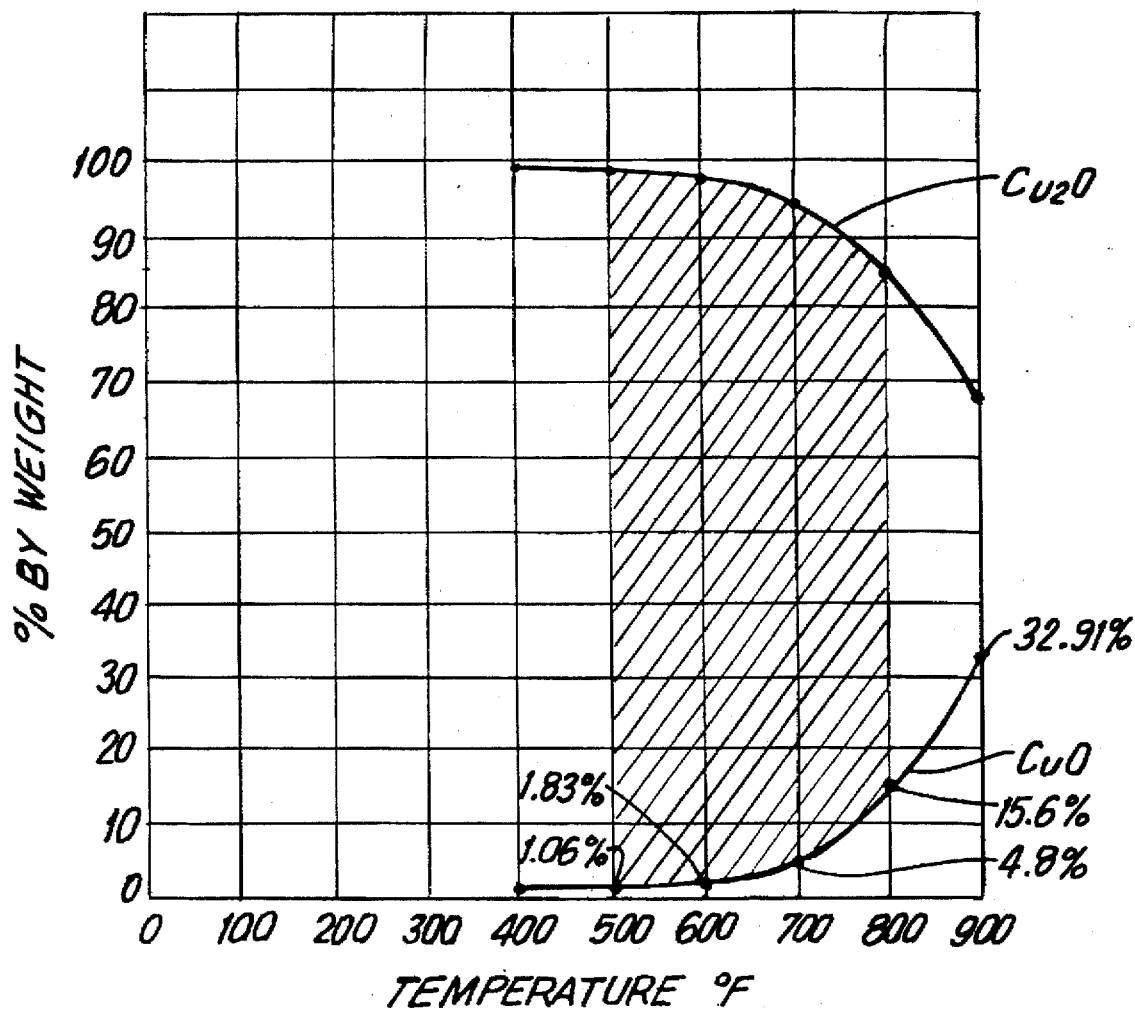
FIG. 2 is a graph showing the relationship between cuprous oxide and the cupric oxide adhering thereto when particles of cuprous oxide are partially surface oxidized to cupric oxide at temperatures ranging from about 400° F. to less than about 900° F.

FIG. 2 is a graph showing the oxidation results obtained at temperatures ranging from about 500° F. to 900° F., the shaded area being more preferred.

Figure 3:
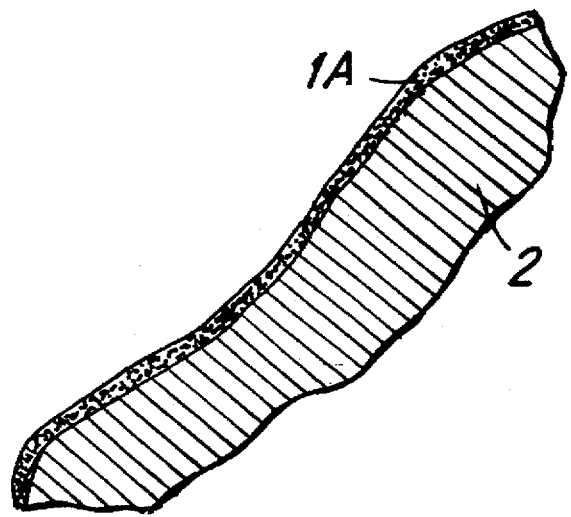
FIG. 3 is an enlarged cross section of a substrate containing a layer of the anti-fouling paint produced in accordance with the invention.

FIG. 3 depicts an anti-fouling coating 1A of blackened cuprous oxide powder on a substrate of a metal segment 2 of a marine structure.

Figure 4:
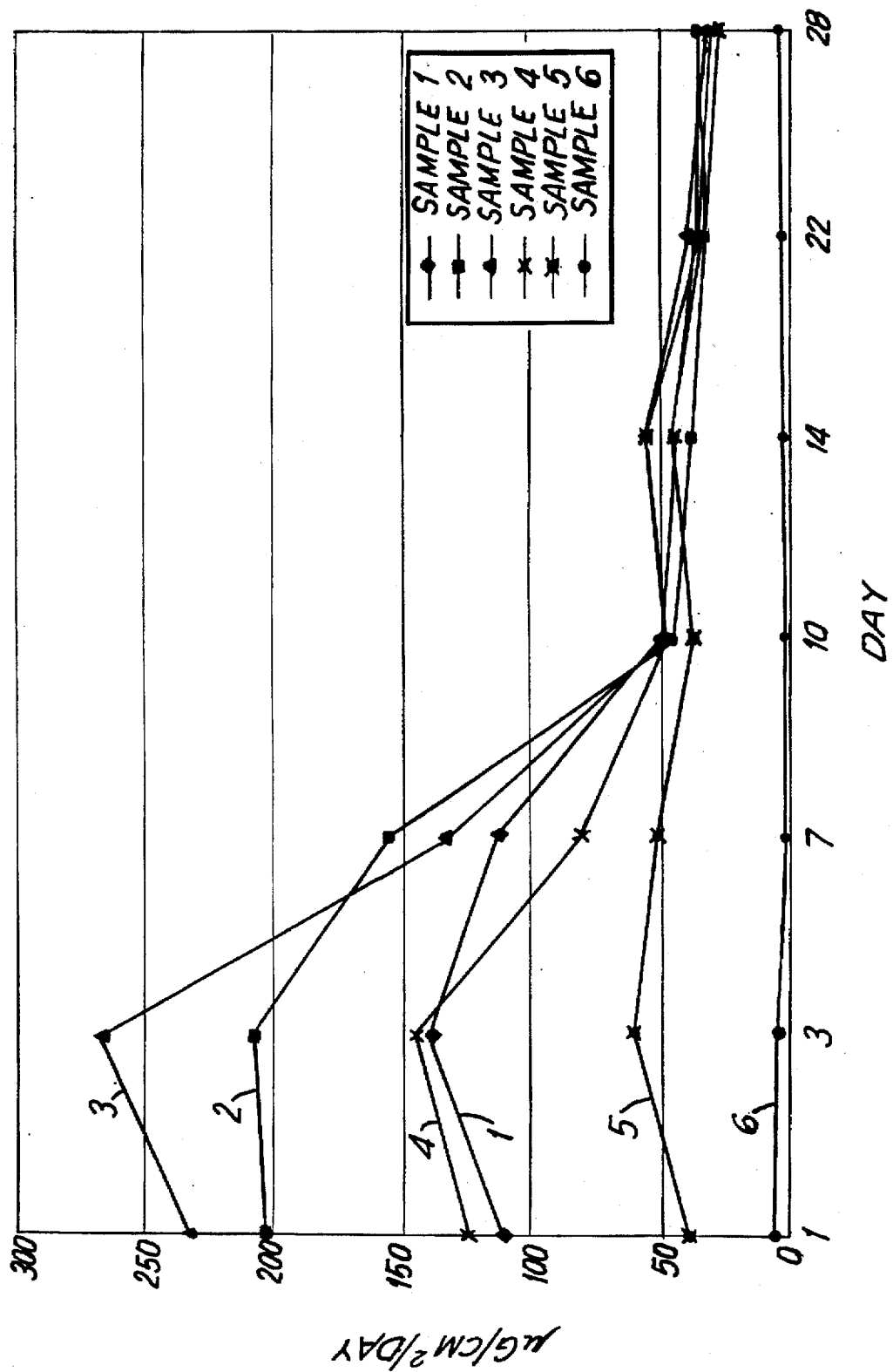
FIG. 4 depicts a set of curves illustrating the leaching rates of commercial products compared to the low leach rate provided by the present invention.

FIG. 4 depicts a set of curves comparing leaching rates of certain commercial products identified as samples 1 to 5 with the leaching rate obtainable with the invention. It will be noted that the commerical products or paints showed a substantially high rate of leaching between one and ten days while the product of the invention exhibited a low controlled rate of leaching which remained substantially constant over a 28 day period.

According to the Woods Hole article, the initial leaching rate is not necessarily a criterion of the performance of a particular paint in service. However, measurements of initial leaching rates are useful for studying the phenomena of surface accumulation and of matrix skin formation. A possible application of the initial leaching rate measurements is in the testing of samples of the anti-fouling agent. Thus, the comparative measurements of the rates of solution of different lots of cuprous oxide may be made by compounding them under carefully controlled conditions in the same paint matrix.

Although the present invention has been described in conjunction with preferred embodiments, it is to be understood that modifications and variations may be resorted to without departing from the spirit and scope of the invention, as those skilled in the art will readily understand. Such modifications and variations may be resorted to without departing from the spirit and scope of the invention, as those skilled in the art will readily understand. Such modifications and variations are considered to be within the purview and scope of the invention and appended claims.

What is claimed is:

1. A composite cuprous oxide powder comprising at least about 80% by weight of cuprous oxide particles and the balance cupric oxide adhering to said cuprous oxide particles thus forming a black coating or layer thereon.

2. The cuprous oxide powder as in claim 1, wherein said powder comprises at least about 85% cuprous oxide by weight.

3. The cuprous oxide powder of claim 2, wherein the amount of cuprous oxide ranges from about 85% to about 98% by weight.

4. The cuprous oxide powder of claim 3, wherein said powder comprises about 90% to 95% cuprous oxide by weight.

5. The powder of claim 1, wherein said powder is a black pigment grade cuprous oxide powder.

6. The black pigment grade cuprous oxide powder of claim 5, wherein said black pigment grade cuprous oxide have particles with an average particle size of less than about 325 mesh, and wherein said cuprous oxide powder is comprised of about 85% to 98% by weight of cuprous oxide and the balance cupric oxide.

7. The black pigment grade cuprous oxide powder as in claim 6, wherein said cuprous oxide powder is comprised of about 90% to about 95% by weight of cuprous oxide.

8. An anti-fouling paint for providing an anti-fouling coating on a substrate for use in marine applications comprising a black cuprous oxide pigment dispersed in a liquid paint vehicle, the amount of pigment in said vehicle ranging from about 3% to 90% by weight, said black cuprous oxide pigment comprising surface-oxidized cuprous oxide particles containing at least about 80% by weight cuprous oxide and the balance cupric oxide as an oxidized coating on said particles of cuprous oxide.

9. The anti-fouling paint as in claim 8, wherein said cuprous oxide powder contains about 85% to about 98% by weight of cuprous oxide.

10. The anti-fouling paint as in claim 9, wherein said cuprous oxide powder dispersed through said liquid paint vehicle is comprised of about 90% to about 95% cuprous oxide.

11. A coated marine structure comprising a substrate normally in contact with seawater, said substrate having a coating thereon comprising the pigment grade black cuprous oxide powder of claim 5.

12. The coated marine structure as in claim 11, wherein said black cuprous oxide pigment comprises at least about 85% of cuprous oxide by weight and the balance cupric oxide.

13. The coated marine structure as in claim 11, wherein said pigment grade cuprous oxide powder comprises about 85% to about 98% by weight of cuprous oxide.

14. The coated marine structure as in claim 13, wherein the cuprous oxide powder is comprised of about 90% to 95% by weight of cuprous oxide.

* * * * *